United States Patent Office 3,161,024
Patented Dec. 15, 1964

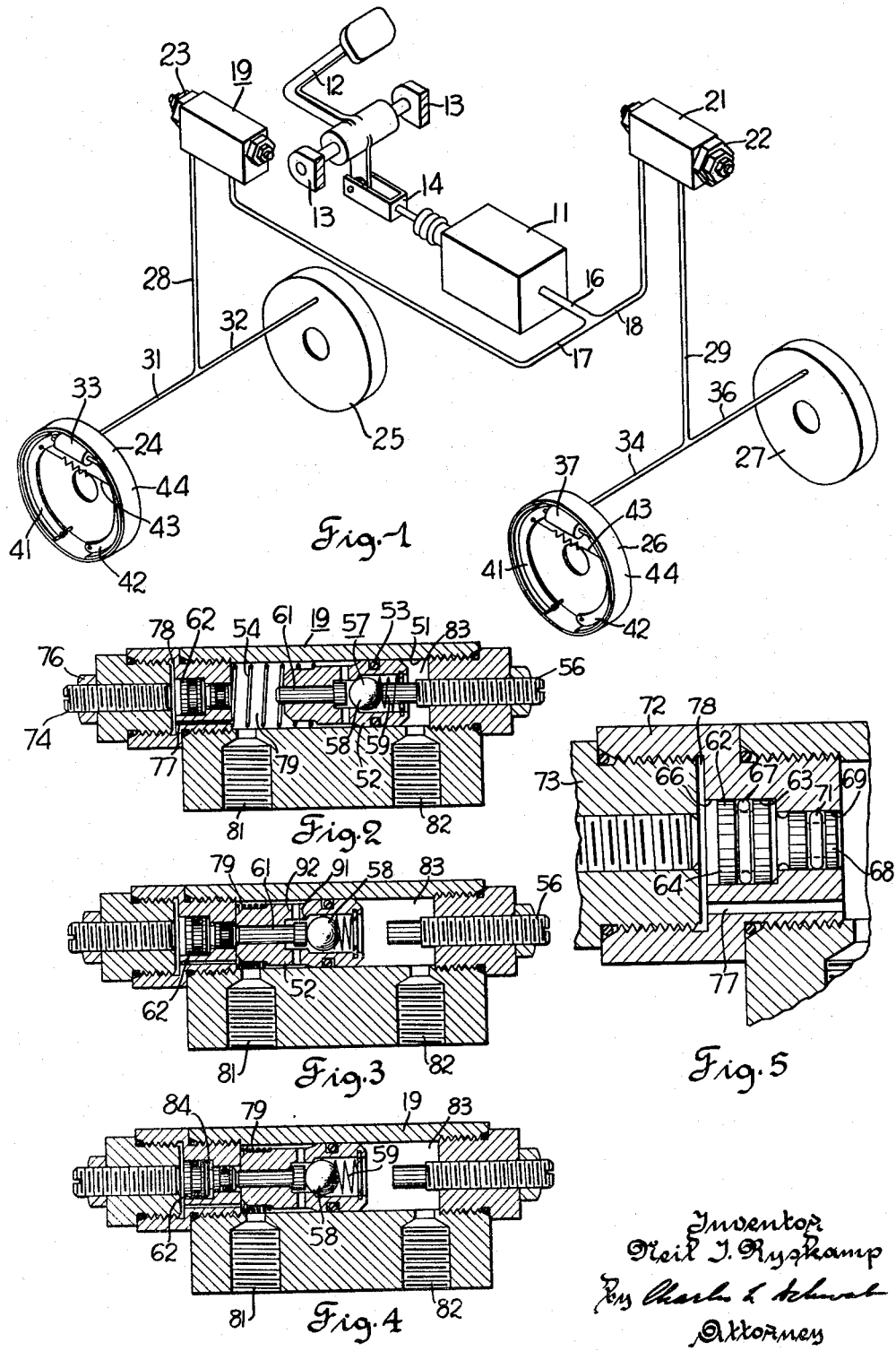

3,161,024
ISOLATING MECHANISM FOR AUTOMATIC
HYDRAULIC BRAKE ADJUSTER
Neil J. Ryskamp, Markham, Ill., assignor to Allis-Chalmers Manufacturing Company, Milwaukee, Wis.
Filed June 18, 1963, Ser. No. 288,831
4 Claims. (Cl. 60—54.6)

This invention relates to an improved hydraulic braking system of the type used in an automatic hydraulic brake adjuster and more particularly this invention relates to the use of a safety device to prevent loss of brake fluid in event of line rupture or other failure in the wheel cylinder circuit.

Heretofore, automatic hydraulic brake adjusters have been suggested, however, upon failure of the circuit between the hydraulic brake adjuster and the wheel cyllinder the metering device of the hydraulic brake adjuster will deliver make-up fluid to the ruptured line thereby resulting in loss of brake fluid in the system. Repeated braking thus results in loss of fluid from the main system to the extent that the entire braking system looses it braking capability.

It is an object of this invention to provide means between the hydraulic brake adjuster and the wheel cylinder circuit to prevent pumping of brake fluid to the wheel cylinder circuit should line rupture or other failure in the circuit occur.

It is a further object of this invention to provide an isolator mechanism which cooperates with the metering valve of the automatic hydraulic brake adjuster which prevents the metering valve from opening to supply make-up fluid should line rupture or other leakage type failure occur in the wheel cylinder circuit.

These and other objects of this invention will be apparent when the following description is read in conjunction with the drawings in which:

FIG. 1 is a schematic view of an automotive type braking system using an automatic hydraulic brake adjuster and in which the present invention is incorporated;

FIG. 2 is a section view of an automatic hydraulic brake adjuster and the isolator of this invention;

FIG. 3 shows the automatic hydraulic brake adjuster in a fluid make-up position and the isolator in its normal operating position;

FIG. 4 shows the automatic hydraulic brake adjuster in its fluid make-up position and the isolator in its circuit isolating position;

FIG. 5 is an enlarged view of the isolator.

Referring to FIG. 1 in which an automotive type braking system is schematically illustrated, the usual hydraulic master cylinder 11 is operated through a foot pedal 12 pivotally supported on the vehicle chassis 13 and connected through linkage 14 with the plunger of the master cylinder. The master cylinder supplies fluid through supply conduit 16 and branches 17, 18 to a pair of identical automatic brake adjusters 19, 21 respectively. In the illustrated embodiment of this invention the isolators 22, 23 form a part of the hydraulic brake adjusters. Fluid is supplied to the wheel cylinders of the braking assemblies 24, 25, 26, 27 through wheel cylinder circuits 28, 29. Wheel cylinder circuit 28 has branches 31, 32 connected to front wheel cylinders 33, only one of which is illustrated. The wheel cylinder circuit 29 has branches 34, 36 connected to a pair of rear wheel cylinders 37, only one of which is illustrated. The wheel cylinders 33, 37 each operate a pair of brake shoes 41, 42 in a conventional manner and a return spring 43 is provided as usual, to contract the wheel cylinder and move the brake shoe away from the brake drum 44 when the operator releases the pedal.

Referring to FIGS. 2 and 5, the automatic hydraulic brake adjuster 19 has a bore 51 in which a metering plunger 52 is disposed for reciprocation and an O-ring 53 provides necessary fluid seal between the plunger 52 and the cylindrical surface defining the bore 51. A coil spring 54 serves as biasing means urging the plunger in one direction to an abutting relation as illustrated in FIG. 2 with an adjustable abutment member 56. A metering valve mechanism 57 is carried in the metering plunger 52. The metering valve mechanism includes a pin 61 and a check valve in the form of ball 58, which is biased to a closed position as illustrated in FIG. 2 by a coil spring 59. The means for isolating the wheel cylinder circuit 28 consists of a differential area piston 62 carried in stepped diameter bore 63. The enlarged portion 64 of the isolator piston 62 is sealed in relation to the enlarged diameter portion 66 of the stepped diameter bore 63 by an O-ring 67 and similarly the small diameter portion 68 of the piston 62 is sealed relative to the small diameter bore portion 69 of the stepped diameter bore 63 by an O-ring 71. The bores 66, 69 are formed in a body 72 which is threaded into a threaded end of bore 51 of the brake adjuster 19. The plug 73 is threaded into the threaded end of body 72 and carries an adjustment screw 74 which is in alignment with the enlarged diameter end of isolator piston 62. A locking nut 76 is provided for set screw 74. A small fluid passage 77 places the chamber 78 at the rear of enlarged portion 64 of the isolator piston in fluid communication with the wheel cylinder circuit 28 through chamber 79 and outlet 81 which is connected to the wheel cylinder circuit 28. Inlet 82 formed in the brake adjuster 19 is connected to branch 17.

Operation

When the operator depresses the pedal 12, fluid is supplied to the input chamber 83 of the brake adjuster 19 thereby moving the metering plunger 52 to the left as illustrated in FIGS. 2 and 3, thereby delivering fluid from output chamber 79 to the wheel cylinders 33. When the brake linings wear to a predetermined extent, the plunger 52 will move sufficiently far to the left to cause the pin 61 to contact the isolator piston 62 which is held in its abutting position, as illustrated in FIGS. 2, 3 and 5, by the hydraulic pressure exerted on its enlarged diameter portion 64. The stepped diameter piston 62 acts as a differential area piston and thus with equal pressure exerted on both its ends it is forced by the fluid pressure to assume its abutment position. The pin 61, as illustrated in FIG. 3, will move the check valve ball 58 off its seat 91 permitting fluid to flow from the input chamber 83 through radial passages 92 to the output chamber 79 thereby supplying make-up fluid to the wheel cylinder circuit 28 though outlet 81. The adjusting mechanism 56 determines the amount of clearance between the brake shoes and drum upon disengagement of the brakes.

Should a wheel cylinder or the fluid lines supplying the brake cylinder fail, there will be insufficient pressure in the wheel cylinder circuit, and as illustrated in FIG. 4, the differential diameter isolator piston 62 will be moved to its nonabutting position therein illustrated, and the ball 58 will not be moved off its seat and accordingly brake fluid will not be permitted to flow from the inlet chamber 83 to the outlet chamber 79. A slight vacuum will be drawn in the cavity 84 but this will not form a sufficient bias to overcome the biasing effect of spring 59 and fluid pressure in chamber 83 acting against ball 58.

This invention makes automatic hydraulic type brake adjusters practical from a safety standpoint. By using two automatic hydraulic brake adjusters 19, 21 with isolators 22, 23, a rupture or other pressure failure of one of the wheel cylinder circuits 28, 29 will not disable the other wheel cylinder circuit, since the isolator will prevent pumping of fluid through the adjuster associated with the defective wheel cylinder circuit. Obviously separate adjusters with isolators could be provided for each brake if desired.

Although brake adjusters 19, 21 are shown spaced from the source of pressure fluid, master cylinder 11, it may be preferable to locate them adjacent to the master cylinder for increased precaution against rupture of intermediate pressure lines 16, 17, 18.

Having now particularly described and ascertained the nature of my said invention and the manner in which it is to be performed, I declare that what I claim is:

1. Apparatus for use in a hydraulic braking system for friction type brakes of the type including a master cylinder and a wheel cylinder, said apparatus comprising an automatic hydraulic brake adjuster adapted for connection between said master cylinder and said wheel cylinder having a reciprocable metering plunger with a valve, actuating means for opening said valve to provide make-up fluid to said wheel cylinder upon predetermined brake wear occurring and an isolating means preventing said actuating means from opening said valve when the pressure in said wheel cylinder does not exceed a predetermined value.

2. The combination of an automatic hydraulic brake adjuster, having a bore, a metering plunger dividing the bore into input and output chambers and a spring biased check valve in said plunger between said chambers, with an isolator including a body secured to said brake adjuster with a portion thereof in fluid communication with and forming a wall of said output chamber, an interior chamber in said body, means establishing free fluid communication between said output and interior chambers, a stepped diameter bore in said body extending between said interior chamber and said output chamber, and a stepped diameter piston having small and large diameter portions in fluid sealing relation with said stepped diameter bore, the outer end of said large diameter portion forming a wall of said interior chamber and the outer end of said small diameter portion presenting an abutment surface for moving said check valve off its seat when the output chamber is subjected to braking pressure and the plunger moves a predetermined distance toward said piston, said piston being incapable of overcoming the biasing of said check valve when said output chamber is subjected to a pressure lower than said braking pressure by a predetermined value.

3. An automatic brake adjuster with isolating means comprising: an input chamber adapted for connection to a source of fluid pressure, an output chamber adapted for connection to a wheel cylinder, a reciprocable fluid metering plunger separating said chambers, check valve means in said plunger, means biasing said check valve means toward its closed position, means for opening said check valve means when said plunger moves toward said output chamber a predetermined distance including a stepped diameter reciprocable piston presenting an abutment on its small diameter end in confronting relation to said check valve means, and means placing the large diameter end of said piston in fluid communication with said output chamber, said piston acting as an abutment for opening said check valve means only when said output chamber is subjected to a predetermined braking pressure.

4. The combination of an automatic hydraulic brake adjuster of the type supplying make-up fluid to the wheel cylinder circuit upon opening of a check valve means in the metering plunger of the adjuster by engagement with an abutment and isolating means including a reciprocating member carrying said abutment and having an abutment position and a retracted position, and fluid pressure responsive means holding said member in its abutment position when the pressure in said wheel cylinder circuit exceeds a predetermined value and permitting said member to occupy its retracted position when the pressure in said wheel cylinder circuit is below said predetermined value.

References Cited in the file of this patent

UNITED STATES PATENTS

| | | |
|---|---|---|
| 1,563,143 | Bailie | Nov. 24, 1925 |
| 2,523,172 | Wilson | Sept. 19, 1950 |